United States Patent [19]

Suzuki et al.

[11] Patent Number: 4,853,239

[45] Date of Patent: Aug. 1, 1989

[54] METHOD FOR PRODUCING A FISH SLURRY INTO EDIBLE PRODUCTS

[75] Inventors: Teisuke Suzuki, Whittier; Hiroshi Matsuhara, Monterey Park, both of Calif.

[73] Assignee: JAC Creative Foods, Inc., Los Angeles, Calif.

[21] Appl. No.: 240,634

[22] Filed: Sep. 6, 1988

Related U.S. Application Data

[63] Continuation of Ser. No. 151,219, Feb. 1, 1988, abandoned.

[51] Int. Cl.[4] .................... A22C 25/00; A22C 25/22
[52] U.S. Cl. ................................. 426/249; 426/272; 426/513; 426/516; 426/517; 426/802; 426/643; 425/319
[58] Field of Search .............. 426/643, 502, 512, 513, 426/514, 517, 802, 805, 249, 272, 516; 425/319

[56] References Cited

U.S. PATENT DOCUMENTS

| | | | |
|---|---|---|---|
| 2,868,650 | 1/1959 | Hammerberg | 426/513 |
| 3,684,527 | 8/1972 | Walter | 426/643 |
| 3,796,812 | 3/1974 | Baensch | 426/643 |
| 4,362,752 | 12/1982 | Sugino et al. | 426/643 |
| 4,557,940 | 12/1985 | Suzuki | 426/643 |

*Primary Examiner*—Marianne Cintins
*Attorney, Agent, or Firm*—William W. Haefliger

[57] ABSTRACT

A fish paste sheet is folded to form a spiral convolution sheet roll; the roll is sidewardly compressed on a belt while traveling; and the compressed roll is cut into portions. The sheet may include superposed sub-sheets of differing coloration.

12 Claims, 2 Drawing Sheets

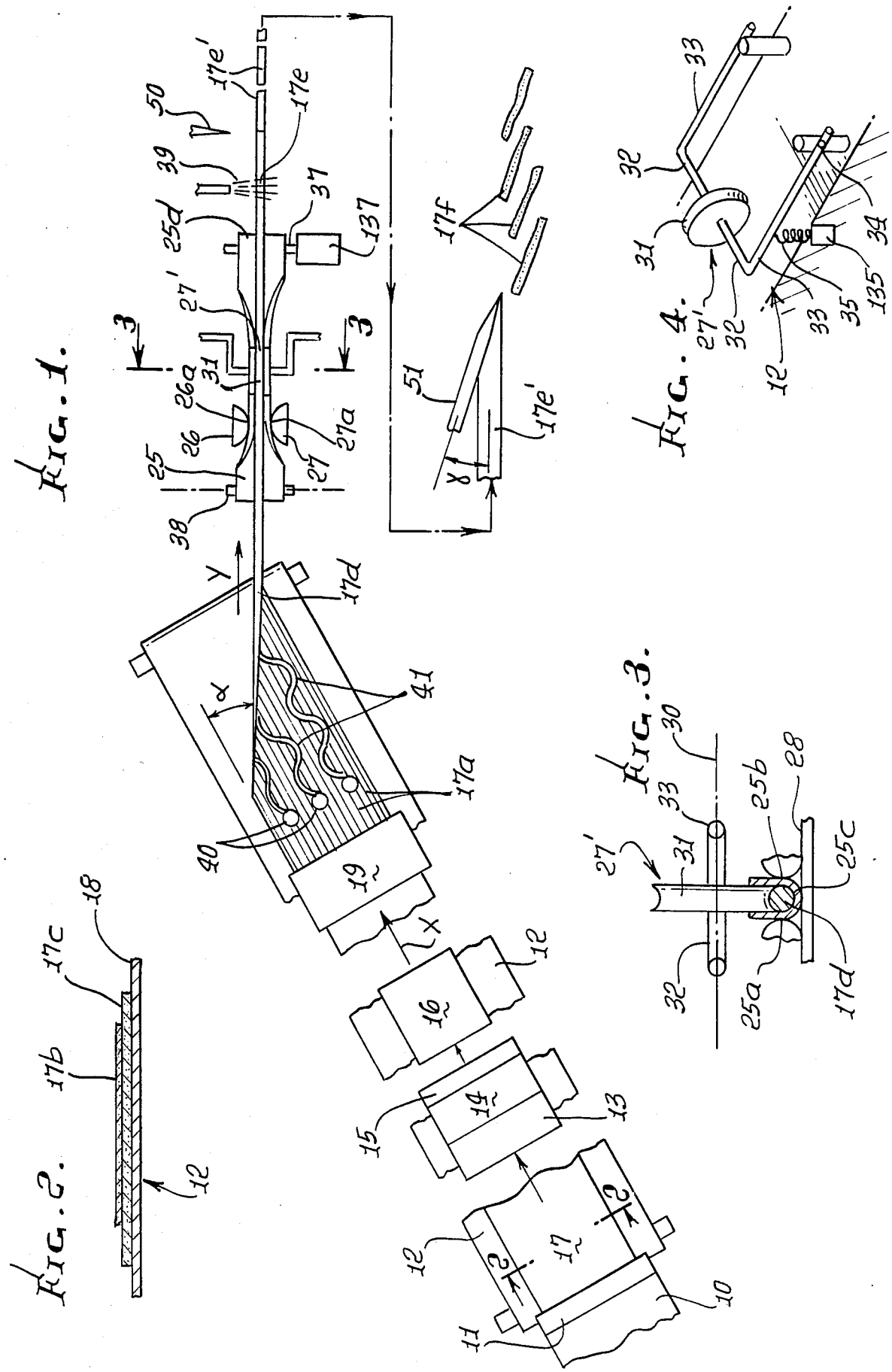

- ~60~ EXTRUDE LAYER #1
- ~61~ EXTRUDE LAYER #2
- ~62~ COOK
- ~63~ COOL
- ~64~ SLIT
- ~65~ REMOVE FROM CONVEYOR
- ~66~ FORM ROLL CONVOLUTION
- ~67~ SQUEEZE ROLL
- ~68~ SPRAY
- ~69~ CUT INTO ROLL SECTIONS
- ~70~ CUT SECTIONS INTO FLAKES
- ~71~ VACUUM PACKAGE
- ~72~ HEAT (STERILIZE) (SETS BINDER)
- ~73~ COOL

4,853,239

METHOD FOR PRODUCING A FISH SLURRY INTO EDIBLE PRODUCTS

This is a continuation of application Ser. No. 151,219 filed Feb. 1, 1988, now abandoned.

BACKGROUND OF THE INVENTION

This invention relates generally to processing of fish, and more particularly to the use of fish paste or slurry in the formation of an affordable fish product It is well known that crab meat is a highly sought and desirable food, for use as in salads, casseroles, etc; however, crab meat is extremely expensive and unaffordable to much of the population There is need for an affordable fish meal or meat product which closely approaches or simulates the taste and palate consistency of crab meat, and which is much less expensive than crab meat.

U.S. Pat. No. 4,557,940 discloses a highly desirable process to produce an edible product; however, in that process, red coloration was added at a downstream point in the process that required extensive subsequent manual packaging to avoid smearing or other destructive displacement of the coloring on the product; also the manipulation of the spiral roll added to the problem; and it was necessary to add and remove paper wrappers to the product during processing to avoid displacement of the red coloration. There is need for apparatus and method serving to avoid these and other problems encountered in such processing

SUMMARY OF THE INVENTION

The method of the present invention, which overcomes the above problems by achieving bonding or setting of the red coloration by heating prior to roll formation, is embodied in the method including the steps:

(a) forming the paste or slurry into a thin coherent sheet, (b) traveling the sheet in a direction "x", (c) progressively folding the traveling sheet to produce a spiral convolution sheet roll traveling endwise in direction "y" which extends at an angle α relative to direction "x", (d) traveling a belt in said direction "y" and folding the traveling belt to exert side loading on the traveling roll to press together said spiral convolutions, (e) and removing the roll from the belt and processing said roll, including cutting off portions thereof.

As will appear, the method typically may include the steps of: progressively folding the belt to channel shape and employing a roller also sidewardly engaging the roll in the channel, to press together said spiral convolutions; yieldably urging the roller against the traveling roll to urge the roll against the belt, thereby positively displacing the roll endwise to create force acting to fold the sheet as aforesaid; allowing the sheet roll to frictionally rotate the roller as the roll is driven endwise by the belt and side loading is exerted on different side portions of the roll tending to tighten said convolutions into a coherent roll; employing two superimposed sub-sheets respectively of red and white coloration, and including adding binder fish paste to at least one of the sub-sheets so that the binder becomes compressed between said convolutions; and subjecting the cut-off portions of the roll to heating to sterilize same, and to cure and set the binder Apparatus according to the invention comprises:

(a) first means for forming the paste or slurry into a coherent sheet and for traveling the sheet in a direction "x", and (b) second means for effecting progressive folding of the traveling sheet to produce a spiral convolution sheet roll traveling in a direction "y" which extends at an angle relative to said direction "x", (c) said second means including an endwise traveling belt and means to cause the belt to engage and draw the roll endwise As will appear, the means to cause the belt to engage the roll includes adjustable structure progressively folding the belt into channel shape to exert side loading on the traveling roll to press together said spiral convolutions; and a roller may be provided for sidewardly engaging the roll and urging the roll sidewardly against the traveling belt, that roller having a rolling axis and an annular surface that is outwardly concave away from said axis, in axial planes, for causing the roll to engage and frictionally rotate the roller as the roll is driven endwise by the belt and such that said side loading is exerted on different side portions of the sheet roll tending to tighten said convolutions into a coherent roll These and other objects and advantages of the invention, as well as the details of an illustrative embodiment, will be more fully understood from the following specification and drawings, in which:

DRAWING DESCRIPTION

FIG. 1 is a plan view showing apparatus for performing progressive steps of the process;

FIG. 2 is an enlarged section taken on lines 2—2 of FIG. 1;

FIG. 3 is an enlarged vertical section taken on lines 3—3 of FIG. 1;

FIG. 4 is a perspective view showing roller tensioning means;

DETAILED DESCRIPTION

Figure 6:
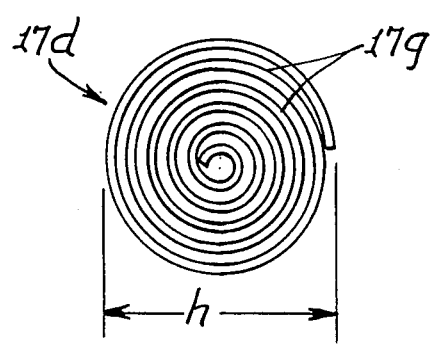
FIG. 6 is a section showing sheet convolutions.

The apparatus for processing fish paste or slurry to produce a fish product (as for example simulated and/or flaked crab meat) includes first means for forming the paste or slurry into a coherent sheet. Such means may include a fish meat grinder or mixer 10 operable to comminute relatively cheap fish meat, such as walleye pollack, or mackerel, for example. A crab flavoring may be added to the batch in the mixer. The resultant paste or slurry is extruded at 11 onto a conveyor 12 and subjected to broiling at 13 (between 148° F., and 155° F.); steam treatment at 14; repeat broiling at 15 (between 152° F. and 158° F.); and cooling at 16. Such processing produces a coherent sheet 17 of fish paste seen in FIGS. 1 and 2 as traveling rightwardly in direction "x" on conveyor surface 18. The sheet also comprises two layers, i.e. an upper thin layer 17b of red colored fish paste, and a thicker lower layer 17c of beige or white colored fish paste. Extruder 11 produces these two superimposed layers, and the lower sheet 17c typically is substantially wider than the upper sub-sheet 17b so that the edge extents of the roll convolutions to be produced are entirely white or beige colored The sheet 17 is somewhat adherent to that surface 18 due to is prior processing, as described. Preferably, the sheet is also slit at 19 into arrow side-by-side ribbons 17a, of thickness between 1.3 and 1.7 millimeters.

Also provided is second means for effecting progressive folding of the traveling sheet, to produce a spiral convolution, elongated sheet roll 17d traveling endwise in a direction "y", which extends at an angle α to the direction "x" Such folding and roll formation peels the sheet or sheet ribbons off the conveyor surface due to endwise tugging of the roll exerted in direction "y" Typically, the roll has a resultant cross dimension "h" of about ¼ inch to 1 inch (for example to simulate the thickness of crab leg). FIG. 6 shows the sheet convolutions 17d wound in a spiral and adherent to one another due to the moistened, tacky surface condition of the coherent sheet or sheet ribbon Angle α is typically between 30° and 60°. The red and white (beige) sub-layers extend endwise substantially throughout the spiral.

The second means referred to may with unusual advantage include structure positioned to exert side loading on the endwise traveling roll to press together the spiral convolutions, whereby a coherent roll is formed Such structure includes an endwise traveling flexible belt 25 and means to cause the belt to engage and draw the roll 17d endwise, in direction y. Such means may for example include belt deflectors 26 and 27 which have laterally presented surfaces 26a and 27a causing the belt lateral extents to progressively bend upwardly at 25a and 25b (see FIG. 3, also) and toward opposite sides of the roll 17d exerting side loading to press together the spiral convolutions In addition, a roller 27 presses sidewardly downwardly on the roll 17d to engage and urge the roll sidewardly downwardly against the now U-shaped lower extent 25c of the belt See FIG. 3, wherein the deflected belt is slidably supported in a table surface 28

The roller has a lateral axis of rotation 30, and an annular surface 31 that is radially outwardly concave, in axial radial planes, for causing the roller concave surface to frictionally engage the roll 17d, thereby causing the roller to be rotated as the roll is pulled endwise, and frictionally, by the belt; thus, side loading is exerted on all side portions of the roll (see FIG. 3) tending to tighten the convolutions into a coherent roll, the convolution of which are adhesively bonded together FIG. 4 shows the roller 27 having its stub axles 32 supported by crank arms 33 pivoted at 34. A spring 35 urges the arms 33 downwardly, thereby to yieldably urge the roller surface 31 forcibly against the roll 17d. Spring tension adjustment at 135 adjusts the side loading on the roll to achieve adjusted pulling of the roll 17d endwise, by the belt, and roll separation from conveyor 12.

Thereafter, the belt side portions 25a and 25b are allowed to expand apart or separate, and return to flat conformation at 25d for travel about the belt conveyor roller 37, and return toward conveyor roller 38. See conveyor drive 137.

The compressed and bonded roll is then sprayed with water 39, at 17e, and a cutter 50 oscillates to cut the roll into sections 17e which do not stick together due to their wetted surfaces Thereafter each roll section is sliced by knife 50, and at an angle α to its axis, producing flakes 17f.

FIG. 1 also shows the addition of means for supplying additional fish paste (highly viscous and tacky) onto the sheet 17 immediately prior to formation of roll 17d thereby to cause the convolutions 17g to better adhere together in response to roll formation and side loading exertion as described Such means may include multiple fish paste extruders 40 spaced laterally apart to supply the added fish paste in streams on the traveling sheet. See for example streams 41. Extruder displacing mechanism may be provided to displace the extruders back and forth crosswise of the sheet 17 to produce wavy streams patterns on the sheet. The wave amplitudes are such that the streams collectively encompass or extend across the bulk of the lateral width of the sheet (or sheet ribbons). Such displacement mechanism is described in U.S. Pat. No. 4,557,940.

The added fish paste between the convolutions tends to bond them together when pressed laterally by the mechanism as described, and without destroying the integrity of such sub-sheets 17b and 17c in their spiral convolution form. Evenly distributed and controlled pressure is achieved, and to substantially greater extent than is possible using the mechanism of U.S. Pat. No. 4,557,940.

Figure 5:
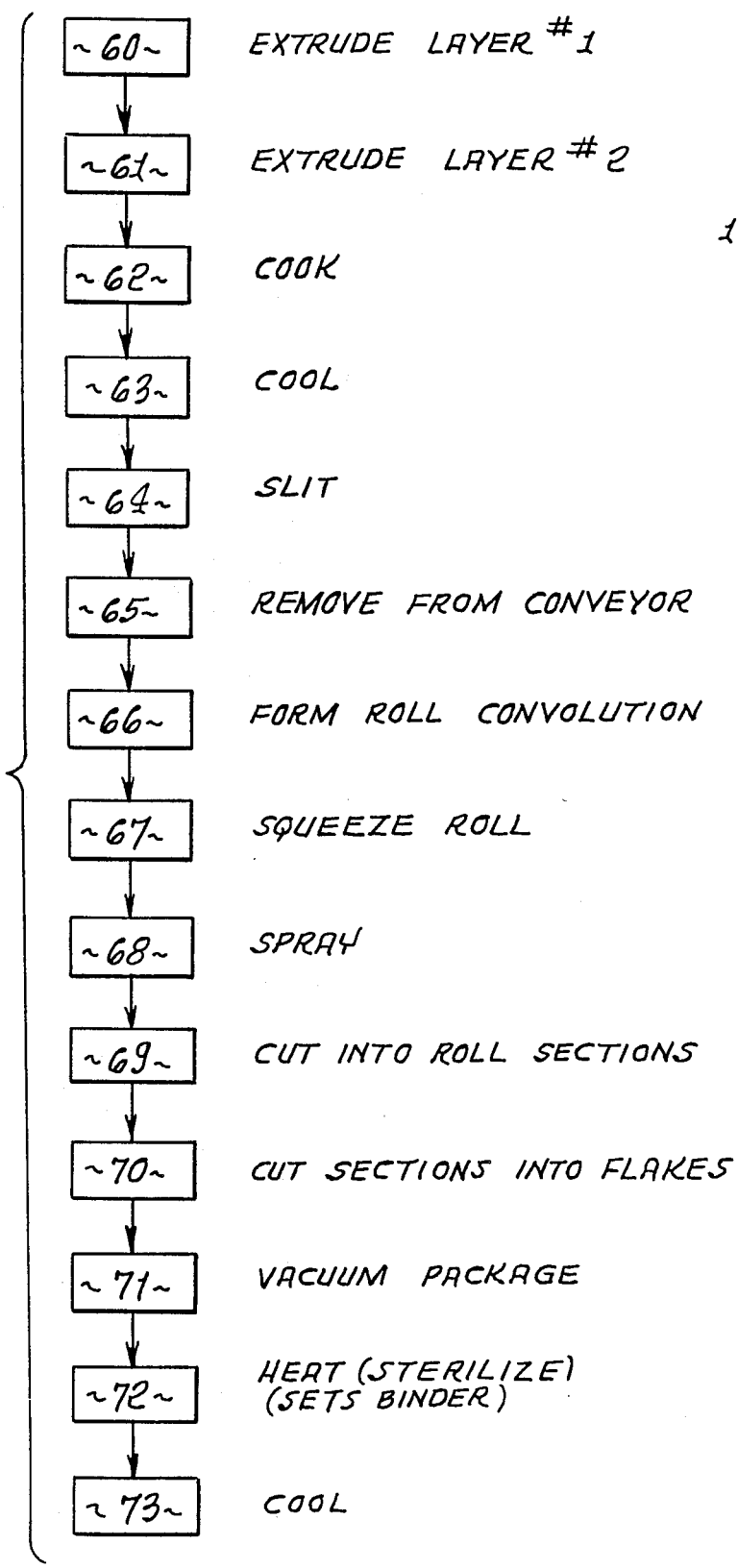
FIG. 5 is a block diagram showing sequential steps of the overall method.

The labeled steps of the complete method are set forth in FIG. 5, at 60–73. Note added step 71 (vacuum packaging of the flakes); 72 (heating of the package and flakes to sterilizing temperatures, also acting to cook the fish paste added at 41, to bind the layers in the flakes); and final cooling at 73 as to refrigeration temperatures for storage and/or shipment.

In FIG. 1, the width of the extended white or beige sub-sheet 17b is made substantially greater than the width of the red colored sub-sheet 17c, whereby the innermost and outermost extents of the roll 17d, and of the flakes 17f are white or beige, and not red, which enhances the analogy to real crab meat.

We claim:

1. A method of processing fish paste or slurry to produce a fish product, comprising the steps of
    (a) forming the paste or slurry into a thin coherent sheet,
    (b) traveling the sheet in a direction "x",
    (c) progressively folding the traveling sheet to produce a spiral convolution sheet roll traveling endwise in direction "y" which extends at an angle α relative to direction "x", where α is between 30° and 60°,
    (d) traveling a belt in said direction "y" and folding the traveling belt to result in a channel form U-shaped belt and to simultaneously exert side loading on opposite sides of the traveling roll to press together said spiral convolutions, and also employing a roller to penetrate into the belf now in channel form and also engage the top of the roll in the channel to press together said spiral convolutions, the roller being urged against the traveling roll to in turn urge the roll against the channel form U-shape belt, thereby causing the traveling belt to positively displace the roll endwise in direction "y" to create force resulting in progressive folding of the belt.

2. The method of claim 1 wherein said roller has a rolling axis and an annular surface that is outwardly concave away from said axis in axial planes, and including the step of allowing the sheet roll to rotate the roller as the roll is driven endwise by the belt and side loading is exerted on different side portions of the roll to tighten said convolutions into a coherent roll.

3. The method of claim 1 wherein the sheet includes two superimposed sub-sheets respectively of red and white coloration, and including adding binder fish paste to at least one of the sub-sheets so that the binder becomes compresses between said convolutions.

4. The method of claim 1 including traveling said sheet in said direction "x" on a traveling support surface to which said sheet adheres until it is forcibly pulled off said surface by the formation of the roll traveling in said direction "y".

5. The method of claim 4 including subjecting said sheet to heating and cooling to cause the sheet to adhere to said surface.

6. The method of claim 1 including supplying binder fish paste onto said sheet immediately prior to said roll formation thereby to cause said convolutions to adhere together in response to said side loading exerted by the belt.

7. The method of claim 6 wherein said supplying of said additional fish paste is effected by supplying same in streams applied onto the traveling sheet.

8. The method of claim 6 including cutting off portions of the roll, and subjecting said cut-off portions of the roll to heating to sterilize same, and to cure and set the binder.

9. The method of claim 1 wherein said forming of the paste or slurry to form the sheet includes extruding two sub-sheets into superimposed relation, one sub-sheet having red coloration and the other sub-sheet having white coloration, the width of the other sub-sheet substantially exceeding the width of the one sub-sheet.

10. The method of claim 1 wherein said forming of the paste or slurry to form the sheet includes extruding two sub-sheets into superimposed relation, one sub-sheet having red coloration and the other sub-sheet having white coloration, the width of the other sub-sheet substantially exceeding the width of the one sub-sheet, and including adding binder fish paste to at least one of the sub-sheets so that the binder becomes compressed between said convolutions.

11. The method of claim 10 including cutting off portions of the roll, and subjecting said cut-off portions of the roll to heating to sterilize same, and to cure and set the binder.

12. The method of claim 11 wherein said cut-off portions of the roll comprise flakes.

* * * * *